United States Patent
Chen et al.

(10) Patent No.: US 7,639,170 B2
(45) Date of Patent: Dec. 29, 2009

(54) SYSTEM AND METHOD FOR PROVIDING OPERATION OF INTERNET POWERED UNIVERSAL REMOTE CONTROLLER

(75) Inventors: Xiangdong Chen, Hangzhou (CN); Wenjie Li, Hangzhou (CN); Bin Zhang, Hangzhou (CN)

(73) Assignees: Hangzhou Silan Microelectronics Co., Ltd., Hangzhou (CN); Hangzhou Bremax Technology Co., Ltd., Hangzhou (CN)

( * ) Notice: Subject to any disclaimer, the term of this patent is extended or adjusted under 35 U.S.C. 154(b) by 611 days.

(21) Appl. No.: 11/510,112

(22) Filed: Aug. 25, 2006

(65) Prior Publication Data

US 2007/0046494 A1 Mar. 1, 2007

Related U.S. Application Data

(63) Continuation of application No. PCT/CN2005/000227, filed on Feb. 25, 2005.

(30) Foreign Application Priority Data

Feb. 27, 2004 (CN) .................. 2004 1 0007546

(51) Int. Cl.
*G08C 19/12* (2006.01)
(52) U.S. Cl. .................. 341/176; 341/173; 340/825.72
(58) Field of Classification Search ............ 340/825.69, 340/825.72; 341/173, 176; 398/106, 112; 348/734
See application file for complete search history.

(56) References Cited

U.S. PATENT DOCUMENTS 6,104,334 A 8/2000 Allport
6,204,796 B1* 3/2001 Chan et al. .................. 341/176
6,640,144 B1* 10/2003 Huang et al. .................. 700/65
7,259,696 B1* 8/2007 Lee et al. ..................... 341/23
7,436,319 B1* 10/2008 Harris et al. ........... 340/825.22
2002/0151327 A1* 10/2002 Levitt .......................... 455/556
2006/0200538 A1* 9/2006 Yuh et al. .................... 709/219

FOREIGN PATENT DOCUMENTS

| CN | 1388484 | 1/2003 |
|----|---------|--------|
| CN | 2497372 | 6/2003 |
| JP | 2002-95073 | 3/2002 |
| JP | 2002-18063 | 6/2002 |

* cited by examiner

*Primary Examiner*—Timothy Edwards, Jr.
(74) *Attorney, Agent, or Firm*—Dorsey & Whitney LLP (57) ABSTRACT

A system and method for the network operation of a universal remote controller (URC) and the URC for realizing said system have been disclosed in the invention, said system comprises: a user service subsystem, a data storing and exchanging device and a user operation subsystem. The network operation method for said URC comprises: collecting the parameters of an existing user's remote controller (RC) via a RC sampling device, analyzing and processing the parameter data as a code program, and transferring to the server device via the Internet in order to store and exchange the data; reading the required program from the server device by the URC via the user terminal device and the Internet to realize the function of the URC. In said URC, the URC is provided with a USB interface circuit for downloading the data on the network into the URC. The invention solves the problem of a number of confused RCs in modern families The network services of the URC can be provided so that a uniform way can be found for the after-service of a plurality of types of RCs.

13 Claims, 10 Drawing Sheets

SYSTEM AND METHOD FOR PROVIDING OPERATION OF INTERNET POWERED UNIVERSAL REMOTE CONTROLLER

CROSS-REFERENCE TO RELATED APPLICATION(S)

This application is a continuation of International application number PCT/CN2005/000227, filed Feb. 25, 2005 which claims priority to Chinese application No. CN 200410007546.6 filed Feb. 27, 2004, the contents of both are herein incorporated in their entirety by reference.

TECHNICAL FIELD

The invention relates to a technology for downloading the Remote Controller (RC) code through the Internet, particularly, refers to the system and method for operating the Universal Remote Controller (URC) simultaneously supporting a plurality of consumable electronic products of different types and different brands.

BACKGROUND ART

The service mode of the conventional URC is directly a point-to-point operation performed by the user by utilizing the original RC. The operation method is single and bothersome. Since these RCs have a variety of types of code-models, so in order to select a suitable type of RC, one must find a type of RC from the fussy specifications and then perform the complicated operation based on the specific operation requirements described in the specification. In this way, the service efficiency of the RC decreases to a large extent. Meanwhile, for the programmer and the user, the contents and the processes are fairly complicated, and it is easy to make mistakes. In the procedure of using it, the user may come into a condition that different brands and different types of RCs cannot be produced within the same RC kernel. In this way, in order to realize the function, the user should buy corresponding URC based on the requirement, thus increasing the economic burden of the user and to be bothersome.

Figure 1:
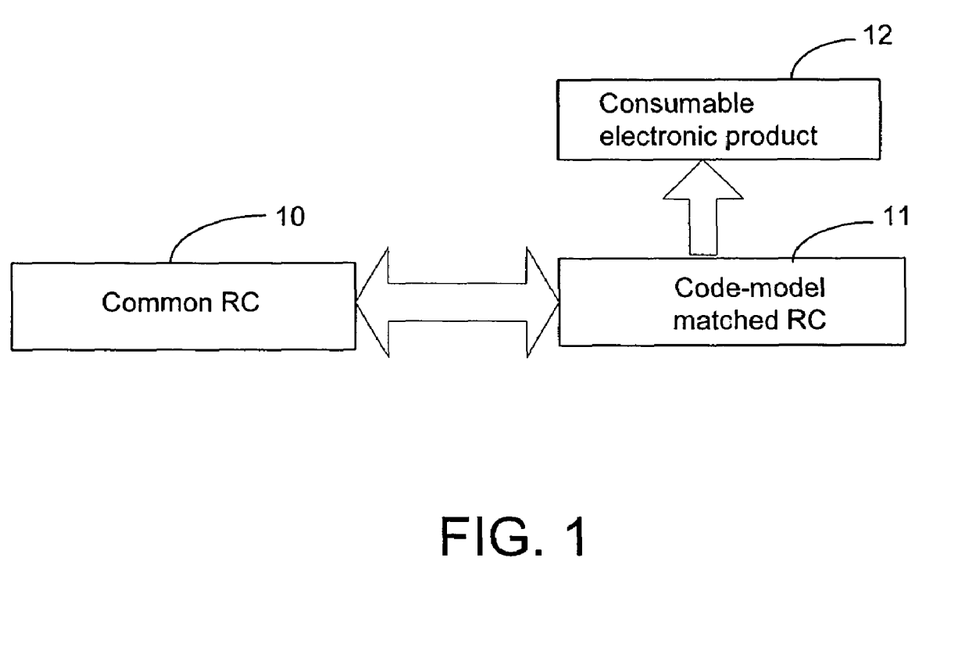
FIG. 1 shows a schematic diagram of the service mode of a code-model matched URC.

Furthermore, as shown in FIG. 1, there is also a learning URC in the market, whose learning method is so called "code model match". Such type of RC highly requires the resource configuration of the hardware and is restricted by the cost of the hardware, and the costs of the hardware also increase correspondingly. Furthermore, once an original RC is lost, the code values cannot be matched. The object for the user to buy a URC is that it can be used to replace the original RC in case the original one is lost. However, the range suitable for using such RC is limited, thus, it cannot be popularized.

Other URCs can control a certain type of electronic product, but it cannot control simultaneously a plurality of types of consumable electronic products, such as in a patent of U.S. Pat. No. 6,437,836 applied in U.S. Meanwhile, the operation method of such RC is complicated and cannot be learned and applied quickly by user.

CONTENTS OF THE INVENTION

The object of the invention is to overcome the above deficiencies and to provide a system and method for operating the URC through the network. Once the user invests to buy a URC, the problem that there are too much and disordered RCs in the modern families can be solved. Different code-models of RCs can be stored simultaneously in the memory area of such a URC, and can be stored in individual areas of $E^2PROM$ based on different addresses. When in use, the desired type of RC can be selected by operating the keys or pressing switch key on the panel, thereby the corresponding code-model and program can be found in the memory area.

Another object of the invention is that the code-model and program of different RCs can be downloaded for many times from the website as necessary to realize the desired function of the RCs. Not only is the operation single, but also unmistakable. Once a certain code-model is not available but requested, the programmer will provide and upload it to the network. The procedure for the user to find the related RC is significantly convenient. When the original electronic home appliances used by the user fall into disuse, the user can use the original URC to control the newly bought electronic home appliances, in this way, a guarantee for long life usage is provided to the user.

A further object of the invention is to provide the network services of the URC. It allows the user to complete the service items requested by him at home, and the service operation of the URC is completed through his terminal PC.

A still another object of the invention is to provide the users with the network service upon request, which are more convenient and quicker than those of the conventional URCs, and with respect to the long-term benefit, the cost is significantly lower than those of the conventional URCs.

Another object of the invention is to provide the network services of the URCs. It provides a set of uniform devices for detecting codes so that it can realize excellently the collection and classification of the data.

A further object of the invention is to provide the network services of the URC which provides a novel URC to the users, said URC is provided with a USB interface circuit for downloading the data on the network into the URC more quickly and more efficiently.

A further object of the invention is to provide the network services of the URC. It allows finding a uniform way in the after service of a plurality of types of RCs. Meanwhile, it also enhances the confidence of using the RC for the consumable electronic appliances.

The system and method for the network operation of the URC in the invention is realized through the following technical scheme. Said system comprises:

A user service subsystem, said subsystem comprising: a RC sampling device, a code detecting device and a programming and uploading device. The RC sampling device is connected with the code detecting device and is used for storing the infrared signal information collected from a prototype RC into a RAM via an infrared receiving circuit. The code detecting device connected with the RC sampling device, the programming and uploading device, is used for analyzing and processing the collected code model information to convert the data to a format to be used directly. The programming and uploading device connected with the code detecting device, and simultaneously with a data storing and exchanging device via the Internet, is used for converting the code model data into the specific programs and storing these programs into the server;

A data storing and exchanging device, or referred as a server device, is used for storing, exchanging and uploading the data for producing the web page and code data and program, and it is connected with the user service subsystem and a user operation subsystem via the Internet;

A user operation subsystem, said part comprises a URC and a user terminal device, which are connected with the data storing and exchanging device via the Internet, and are used for providing the user with the services of the URC via the network, wherein the user terminal device is used for realizing service operation. It is equipment for the users to connect the network. The URC is used for realizing the downloading of the program data and said device can be used by the users to achieve the remote control of the electronic home appliances. The URC can connect with Internet through a USB interface and the user terminal device is used for connecting the network. If the infrared signals can be received and transmitted directly by the user terminal device, then the communication can also be realized directly by an infrared transmitting and receiving device.

Said URC comprises:

A keyboard matrix, said keyboard matrix comprises a VCD/DVD keyboard matrix region, a VCR keyboard matrix region, a TV keyboard matrix region, and a common keyboard matrix region, the keyboard matrix can combine two or more different of the RC keyboards of consumable electronic products based on the requirements, wherein each keyboard matrix region comprises the basic keyboard content required.

a MCU kernel, used for processing the transmission of the program data while downloading the program, including communicating with the USB interface circuit and controlling the operation of the $E^2PROM$ for storing the data. During the procedure of using the RC, the program in the $E^2PROM$ can be processed directly to realize the function of the RC, said MCU kernel is connected with the keyboard matrix;

$E^2PROM$, used for storing the program to be saved while downloading the program, and for outputting the stored program when sending the codes, said $E^2PROM$ is connected with the MCU kernel. Said $E^2PROM$ can be divided into several areas based on the addresses, a space having a certain size is used as the storing space of one RC, thereby several types of RCs can be stored individually in $E^2PROM$.

A USB interface circuit, used as an interface circuit while downloading the program data, said USB interface circuit is connected with the MCU kernel, wherein the downloaded data enter the USB interface circuit via a USB interface line, the data format is converted from a serial to a parallel within the USB interface circuit, and then enter the MCU kernel via the data lines, the control relationship there between are implemented by a control line. The data are sent to the MCU kernel and processed by a program, and the data are sent to $E^2PROM$ via parallel format for storing. The control of the $E^2PROM$ by the MCU kernel is realized through the control line.

Said URC also comprises an infrared transmitter used for sending the code models during the code sending operation, which is driven by a transistor, and said infrared transmitter is connected with the MCU kernel;

The method of the network operation of said URC comprises the steps of:

The parameters of the user's original RC are sampled by the RC sampling device;

The parameters of the user's RC collected by the sampling device are analyzed and processed by the code detecting device to allow the code-model parameters to be accurate and detailed;

The data of the detected codes are inputted to the programming and uploading devices. These code-model data are converted into the specific programs and transmitted to the server device via the Internet in order to be used for the data storing and exchanging, and the server device can be used as a platform for the data exchange; the required data or programs are read by the URC from the server device via the user terminal device and the Internet. The steps for said reading the required programs are: initializing firstly within the MCU circuit, then detecting whether $E^2PROM$ can operate correctly or not, the object of the detection is to decide whether the fixed contents at the specific addresses in $E^2PROM$ can be read and written before the program jumping to $E^2PROM$. If not, then it will jump to the standby state and will be indicated by an error lamp at this time, if it can operate correctly, then detecting whether the USB port is connected or not. If it is connected, then the USB transmission operation will be performed to input the program data into the MCU kernel via the USB interface protocol, and then to assign the data or program to the corresponding locations in the $E^2PROM$ based on the entry addresses.

The user service subsystem is composed of a sampling device, a code detecting device and a uploading device, wherein the sampling device refers to a device used for collecting the data of the prototype devices, the prototype devices are various types of RCs from different factories, and which can be supplied by the service providers or the agents. The code detecting device is supplied by the service provider, and it can be used by itself, or used by an authorized agent.

The data storing/exchanging device is implemented by the server equipment, and mainly for implementing the uploading and the storing of the data. Herein, the establishment of a RC website is an absolutely necessary step in the data circulation. A domain name of a website used for saving dedicatedly the code data and programs of RCs is requested by the service provider based on the requirements, then the server is set internally based on the domain name, and after programming the code data and program, it is uploaded to the website.

In the invention, the USB interface circuit in the URC can be substituted by an infrared receiver, which adapts to a situation that the user's terminal is provided with a receiver for receiving the infrared transmission. In consideration of the cost, the USB interface circuit can be made directly into the MCU kernel as an embedded part. Meanwhile, $E^2PROM$ can be embedded into the circuit to achieve an integrated single chip.

In order to realize the objects, advantages and novel features above, the invention provides a URC for the users. However, it is different from the general URC and can be operated on the network and support simultaneously the downloading operations of the key programs of the RCs of different types and brands. After connecting the USB interface of the user terminal with the USB interface of the URC, the data streams are downloaded from the dedicated website provided by the service provider to the URC. The key programs stored in the server are downloaded to the $E^2PROM$ based on the requirements of the clients. These key programs of the RC can be downloaded entirely, or the programs for most frequently used keys can be downloaded selectively.

The RC website is maintained by the service provider, and various key programs of the RCs corresponding to different consumable electronic products of different types and brands are listed on the website. After the user logging on the RC website, the downloading operation of the corresponding RC key program can be performed according to the keyboard subarea of the URC. Specifically, the user can select a desired RC firstly by two methods, such as selecting on the selection bar on the web page, or entering a specific type number into the code list for looking up directly. At this time, the physical graphic of said RC (mainly, the keyboard setting) may appear at one side of the web page, and the keyboard graphic of the URC appears at another side of the web page. Each key on the physical graphic corresponds to a segment of program, the keys on the keyboard graphic of the URC at another side have no program, the program corresponding to the key on the physical graphic will be transferred to the subarea of the corresponding keyboard of the URC when it is activated by click. The color of the corresponding key will be changed, at this time, the data are stored only in the buffer area of the terminal device. When all of the programs of the required keys have been transferred, the colors of all of the keys may be changed, at this time, a confirmation key at the bottom part of the screen is highlighted, after it is clicked by the user, the programs will be downloaded once to the E²PROM address space corresponding to the URC via the USB interface, in this way, the downloading operation of the key program of one keyboard subarea has been completed by the user. In the above operation procedure, the key programs corresponding to said keyboard subarea can be downloaded entirely, or it can be downloaded partly (for example, only some key programs used commonly are selected), because each key program is individual. If the key programs of other keyboard subareas are to be downloaded by the user, the above operation procedure can be repeated. In the above entire download procedure, the user can select the download operation to be performed individually according to the respective keyboard subarea, or to be downloaded once to the E²PROM address space corresponding to the URC via the USB interface circuit after the key programs corresponding to all of the keyboard subareas of the URC have been selected. After completing the download of the above data, the URC is provided with the corresponding function of the above selected RCs.

In the invention, the code values required for programming the RC program are originated from the prototype devices provided by the users or the service providers, and are obtained by testing the prototype devices through the sampling/code detecting device; it can also be: the code values tested by the agents based on the prototype devices by using the sampling/code detecting device provided by the service providers, which are saved according to a standard format, then the data are sent to the service providers together with the important information relating directly to the RC, such as the type, manufacturing factory, operation range, and the like, of the tested prototype device, and said RC can be described and remarked in detail on the web page by the service provider based on the code value data and the information provided. After this code value information have been collected, the programmer writes a program based on the data format of the code data and program, and debugs it after completing the program. If no any problem is found after debugging, then it is uploaded to the website by the administrator of the website based on the type of RC.

The user service subsystem of the invention is composed of a sampling device, a code detecting device and a programming and uploading device. A data storing & exchanging device is used mainly for implementing the making of the web page and the upload of the code data and program, and is handled dedicatedly by the person who is especially responsible for it. A user operation subsystem comprises a URC and a user terminal device.

The user service subsystem and the data storing & exchanging device are connected via the Internet, herein, the establishment of a RC website is an absolutely necessary step in the data circulation. A domain name of a website used for saving dedicatedly the RC code programs is requested by the service provider based on the requirements, then a server is set internally with the domain name, and after programming the code data and program, it is uploaded to the website.

A user operation subsystem, this part comprises a URC and a user terminal; said subsystem is also connected via the Internet, mainly for completing the downloading of the data and for utilizing the RC.

The objects, advantages, and novel features will be described in the following embodiments.

MEANS OF SPECIFIC IMPLEMENTATION

The embodiments of the invention will be introduced in detail below. FIG. 1 shows a schematic diagram of the service mode of a code-model matched URC. This diagram describes the service mode of the code-model matched RC, 10 is a common RC, 11 is a code-model matched RC, and 12 is a consumable electronic product. The code-model matched RC receives the infrared signals from the common RC via the receiving device, and the code values are saved directly into the internal memory device after analyzing and processing. When operating, the consumable electronic product is controlled by said RC.

Figure 2:
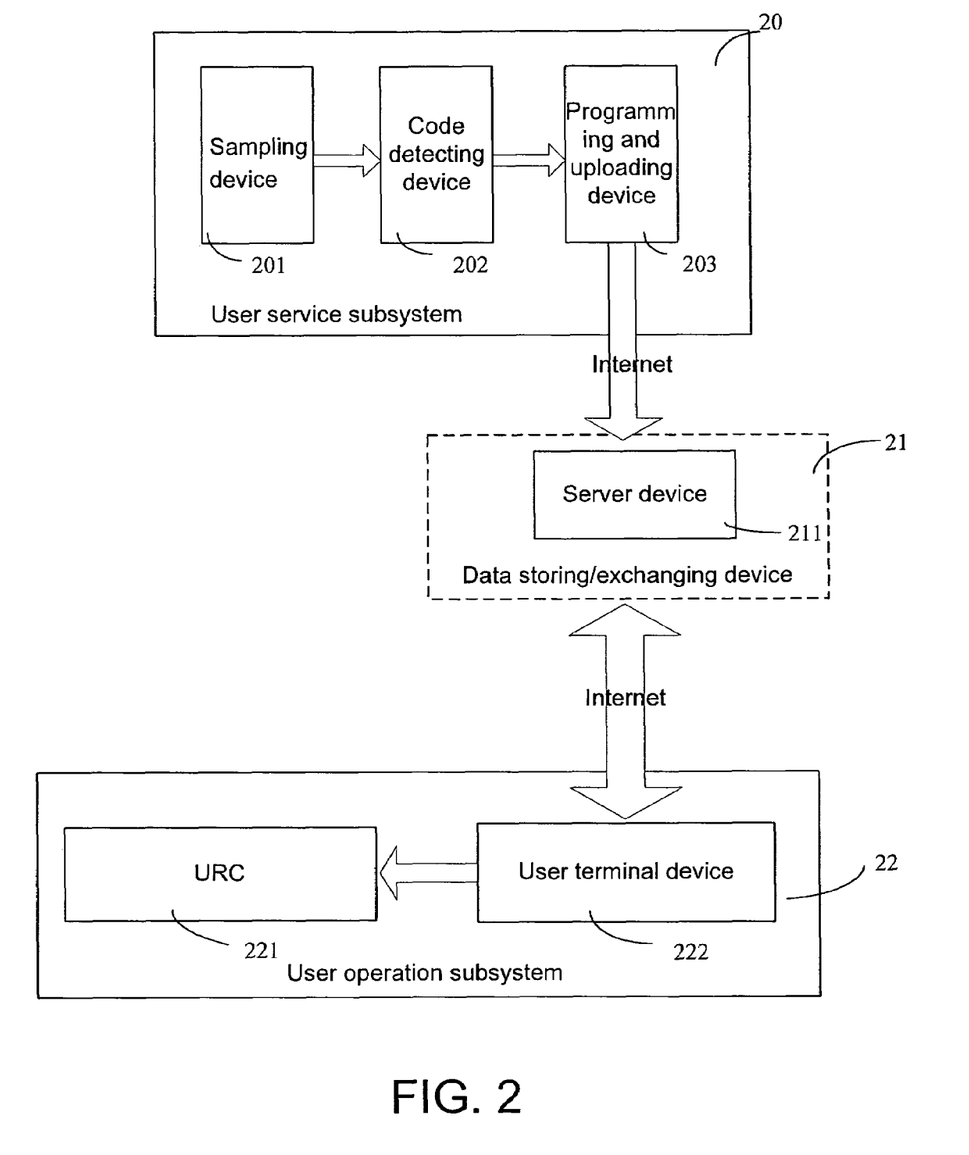
FIG. 2 shows a schematic diagram of the entire system in the invention.

FIG. 2 shows a schematic diagram of the entire system in the invention, and it is used to describe the construction of the system and the formation of the service mode. In the embodiment shown in FIG. 2, the invention is composed of mainly three parts: a user service subsystem 20 comprising a sampling device 201, a code detecting device 202 and a programming and uploading device 203; a data storing/exchanging device 21, or referred as the server device 211. This part is used to store, exchange and upload the data of the produced web page and the code data and program, and is handled by the person who is responsible for it; a user operation subsystem 22, this part comprises a URC 221 and a user terminal device 222.

The user service subsystem and the data storing/exchanging device are connected via the Internet, and the data storing/exchanging device is an absolutely necessary step in the data circulation in the present system. Herein, the establishment of a RC website is: a domain name of a website used for saving dedicatedly the RC code data and programs requested by the service provider based on the requirements, then a server is set internally with the domain name, and after programming the code data and program, it is uploaded to the website.

A user operation subsystem, this part comprises a URC and a user terminal; said subsystem is also connected via the Internet, mainly for completing the downloading of the data and for utilizing the RC herein. In the user service subsystem, the ultimate object is to obtain the code program of the RC. The user service subsystem is composed of a sampling device 201, a code detecting device 202 and a uploading device 203, wherein the sampling device 201 refers mainly to a sampling device used for collecting the data of the prototype devices, the prototype devices are various types of RCs from different factories, and which can be supplied by the service providers or the agents. The code detecting device 202 is supplied by the service provider, and it can be used by itself, or used by an authorized agent. The programming and uploading device 203 realizes mainly the conversion of the code values to the program and the uploading of the program. The server device 211 is set generally by the service provider to realize herein the function of data storing, exchanging, and the like. The terminal device 222 is connected with the URC 221 by the user. By logging on the dedicated RC website established by the service provider, the user can realize the downloading of the code-model data of the RC by operating on the screen.

Figure 3A:
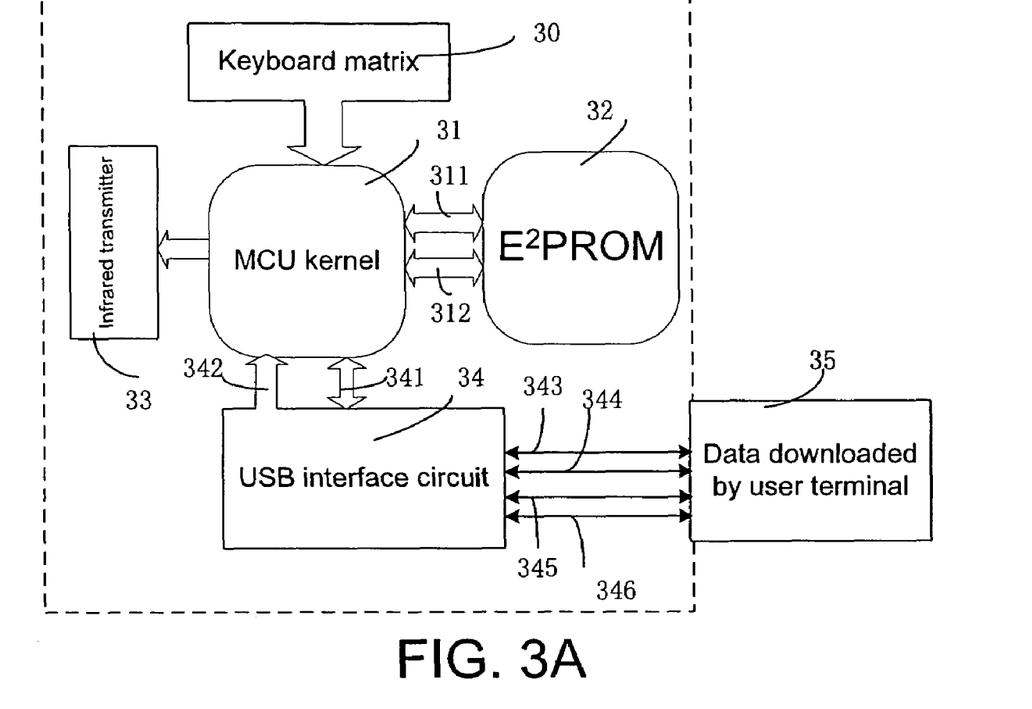
FIG. 3A shows an embodiment of an internal structure of the URC in the invention.
Figure 3B:
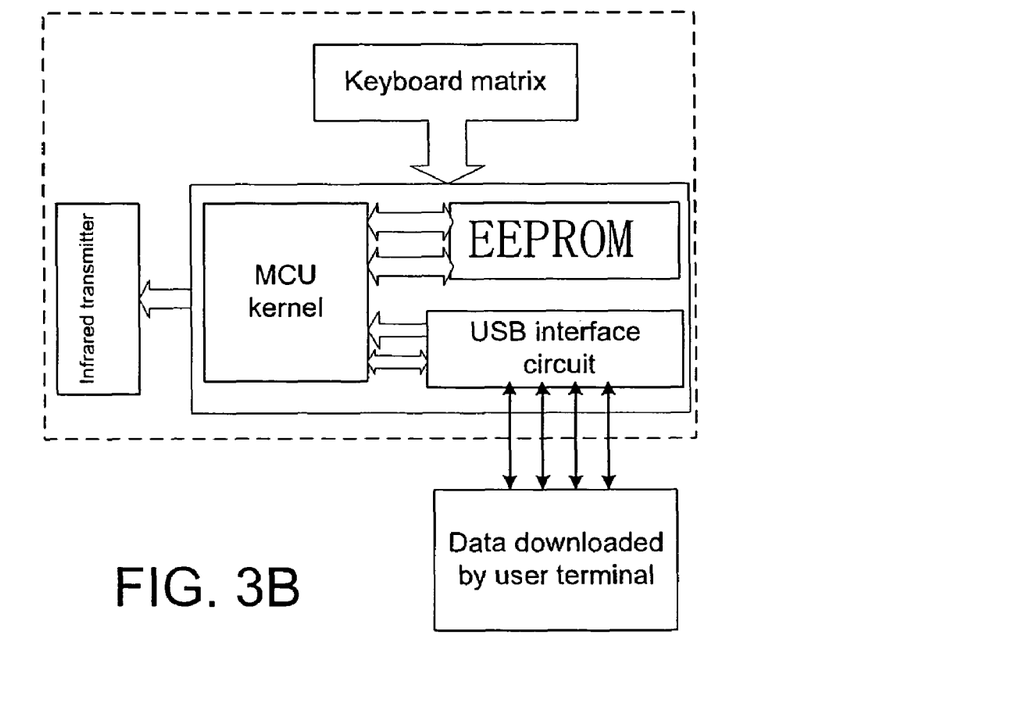
FIG. 3B shows an improved embodiment of the URC of FIG. 3A in the invention.

FIG. 3A shows an embodiment of an internal structure of the URC in the invention. FIG. 3B shows an improved embodiment of the URC of FIG. 3A in the invention. In the network services for realizing the URC, the URC is one important hardware device. FIG. 3A is an internal firmwork diagram of the URC. It is composed of a keyboard matrix 30, a MCU kernel 31, an $E^2PROM$ 32, an infrared transmitter 33, a USB interface circuit 34, wherein the downloaded data 35 enter the USB interface circuit 34 via four USB interface lines 343, 344, 345, and 346. Within the USB interface circuit, the data format are converted from serial to format and enter to the MCU kernel 31 via the data line 342, the control relationship between them are achieved by the control line 341. The data are transferred to the MCU kernel 31, processed by a program, and the data are sent to $E^2PROM$ 32 for storing via the parallel format 311. 312 is a control line for the MCU kernel to control $E^2PROM$. Herein, $E^2PROM$ is used for storing the code-model program of different types of RCs into the individual areas, and the area space is assigned based on different addresses.

FIG. 3B is an integrated form of FIG. 3A, wherein MCU kernel 31, $E^2PROM$ 32, USB interface circuit 34 in FIG. 3A are integrated in one circuit to realize said function.

Figure 4:
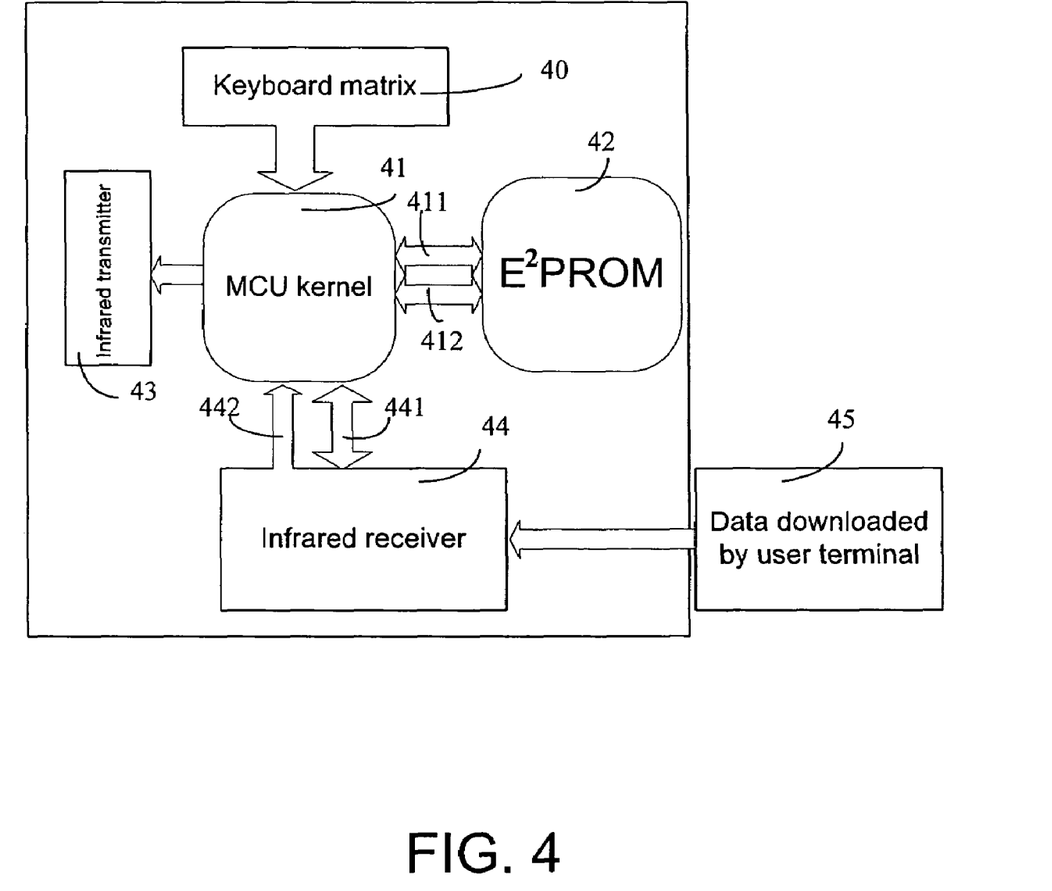
FIG. 4 shows another embodiment of an internal structure of the URC in the invention.

FIG. 4 shows another embodiment an internal structure of the URC in the invention. FIG. 4 is another internal configuration diagram of the URC, which is composed of a keyboard matrix 40, a MCU kernel 41, an $E^2PROM$ 42, an infrared transmitter 43, and an infrared receiver 44. The significant distinction between FIG. 4 and FIG. 3A, FIG. 3B is the method for downloading the program. The communication is performed via a USB interface in FIG. 3A, while the communication is performed via the infrared transmitting and receiving devices in FIG. 4. With different communication methods, the data inputted to the MCU kernel are also different. Meanwhile, in addition to these two methods for downloading the data, to realize the downloading of the data through the communication via the serial format is a method used conventionally. The reference sign 30 in FIG. 3A and the reference sign 40 in FIG. 4 both indicate the keyboard matrixes, their configurations are shown specifically in FIG. 5. Each key in FIG. 5 corresponds to a corresponding segment of the program stored in $E^2PROM$ of FIG. 3A and FIG. 4. The infrared transmitter 33 and 43 in these two diagrams are components used for transmitting the code-model.

Figure 5A:
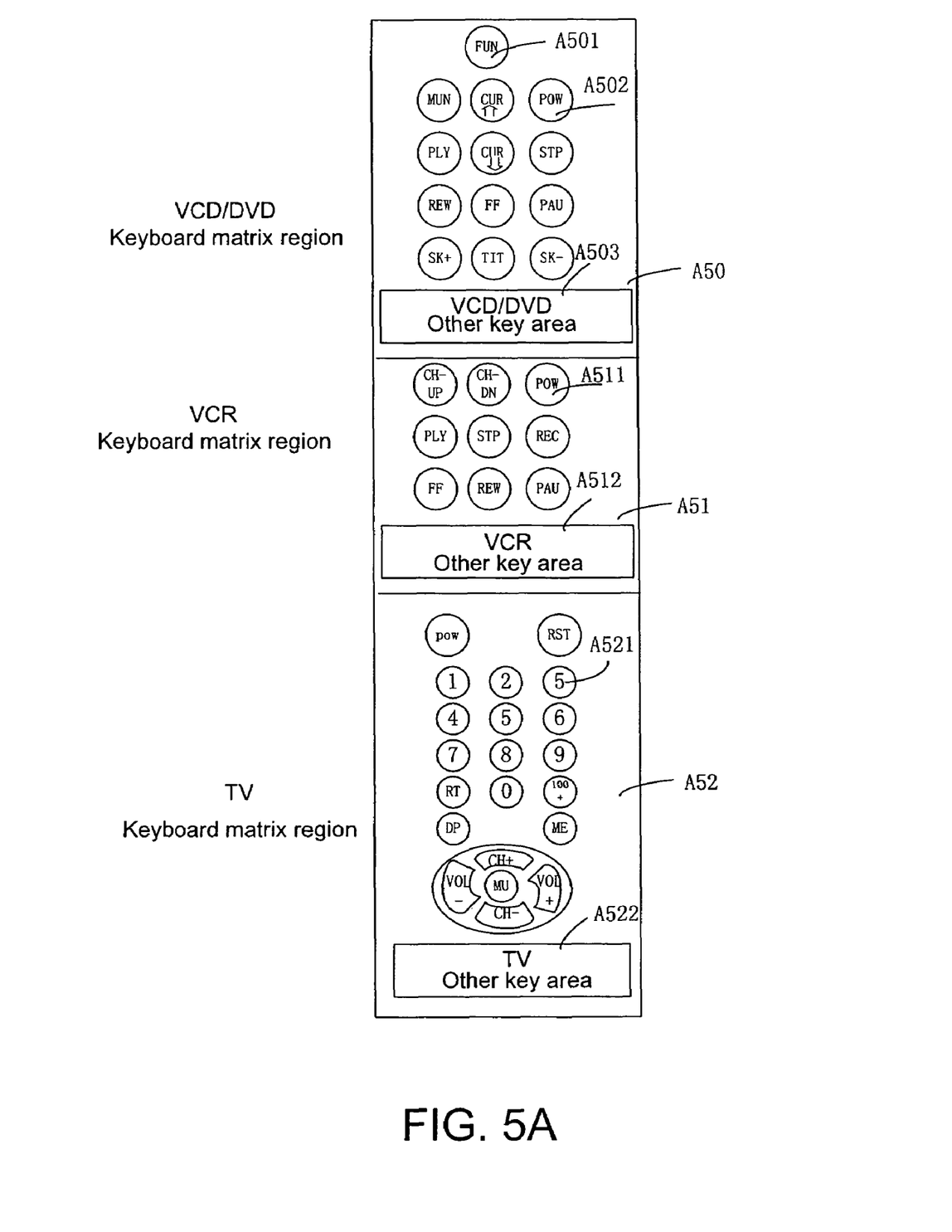
FIG. 5A shows a schematic diagram of a basic configuration of the appearance of the keyboard matrix of the URC in the invention.

FIG. 5A shows a schematic diagram of a method of dividing areas in the keyboard matrix of the URC in the invention. A combination drawing of the keyboard matrix of three types of RCs, such as VCD/DVD, VCR, TV, is shown in FIG. 5. Reference sign A50 is a keyboard matrix region for VCD/DVD, A51 is a keyboard matrix region for VCR, A52 is a keyboard matrix region for TV.

Figure 5B:
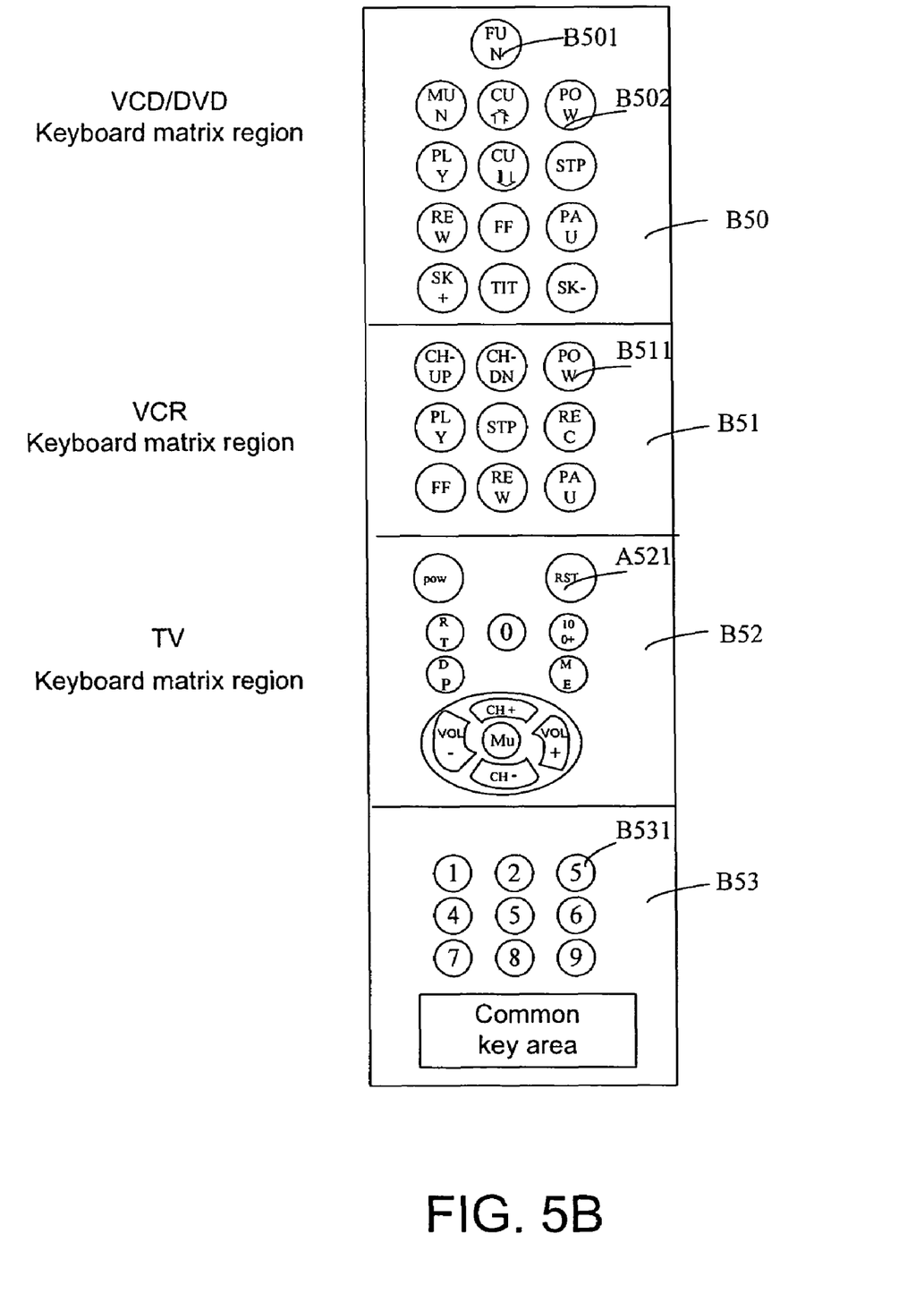
FIG. 5B shows a schematic diagram of another basic configuration of the appearance of the keyboard matrix of the URC in the invention.

FIG. 5B shows a schematic diagram of another method of dividing areas in the keyboard matrix of the URC in the invention. FIG. 5B is a schematic diagram of the keyboard matrix combination of the URC having common key area, the keyboard matrix shown in the drawing is combined by the keyboard matrix regions of four types of RCs. It can also be divided into two parts, three parts, or five parts, and the like. The combination of these four parts can be based on different situations. Normally, it is combined by the RCs of the respective consumable electronics, such as VCD/DVD, VCR, TV, CD device, power amplifier, air conditioner, digital TV STB, and the like. The keyboard matrix combination of three types of RCs, such as VCD/DVD, VCR, TV, is shown in FIG. 5B, wherein B50 is the keyboard matrix region for VCD/DVD, B51 is the keyboard matrix region for VCR, B52 is keyboard matrix region for TV, and B53 is common keyboard matrix region, wherein the key B501 FUN can be used to convert the function of the common keyboard matrix of these three types of RCs, wherein B502, B511, B521 are the keys for the respective RCs. In the common keyboard matrix, for example, 0~9 code sending function, the keys 0~9 can be used by using the conversion of the key B501 FUN. In this way, by setting the common keyboard matrix, the redundant keys are reduced thereby the size of the panel will be reasonable. On the panel of the URC, each type of RC corresponds to a segment of program space in $E^2PROM$, and in this program space, each key further corresponds to a small segment of program, which forms a corresponding relationship, and it can be called quickly based on the address.

Figure 6A:
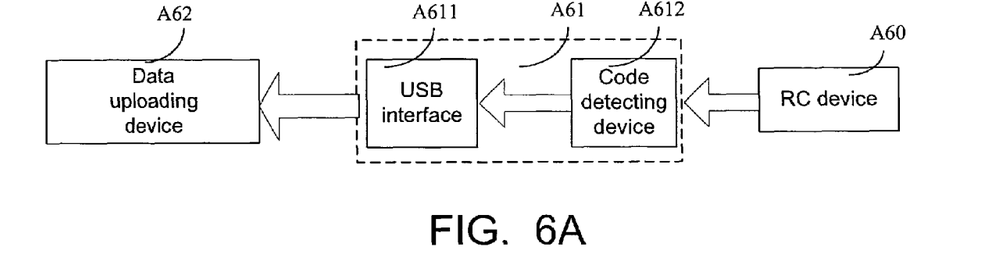
FIG. 6A shows an embodiment for uploading the data in the invention.

FIG. 6A shows an embodiment for uploading the data in the invention. After the data in the RC device A60 sends the code-model, the specific data and form of the code-model is detected by the code detecting device A611, and the code-model data are transferred to the data uploading device A62 via the USB interface A612. In the uploading device A62, it is required that the code-model data is converted into the program segment for uploading.

Figure 6B:
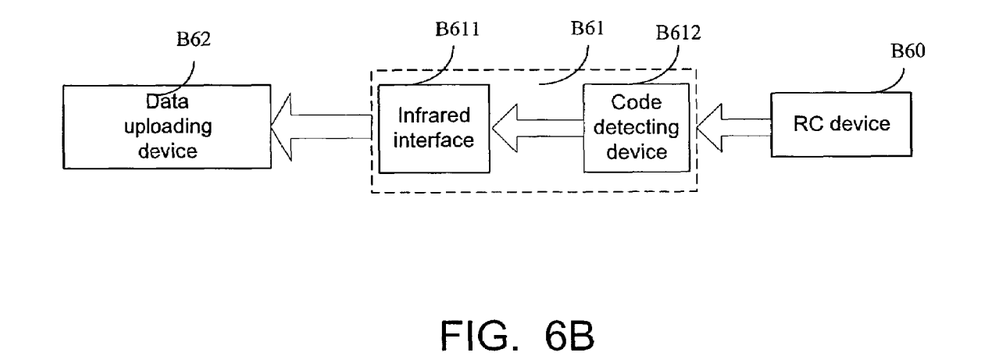
FIG. 6B shows another embodiment for uploading the data in the invention.

FIG. 6B shows another embodiment for uploading the data in the invention. After the data in the RC device B60 sends the code-model, the specific data and form of the code-model is detected by the code detecting device B611, and the code-model data are transferred to the data uploading device B62 via the infrared interface B612. In the uploading device B62, it is required that the code-model data is converted into the program segments for uploading.

Figure 7:
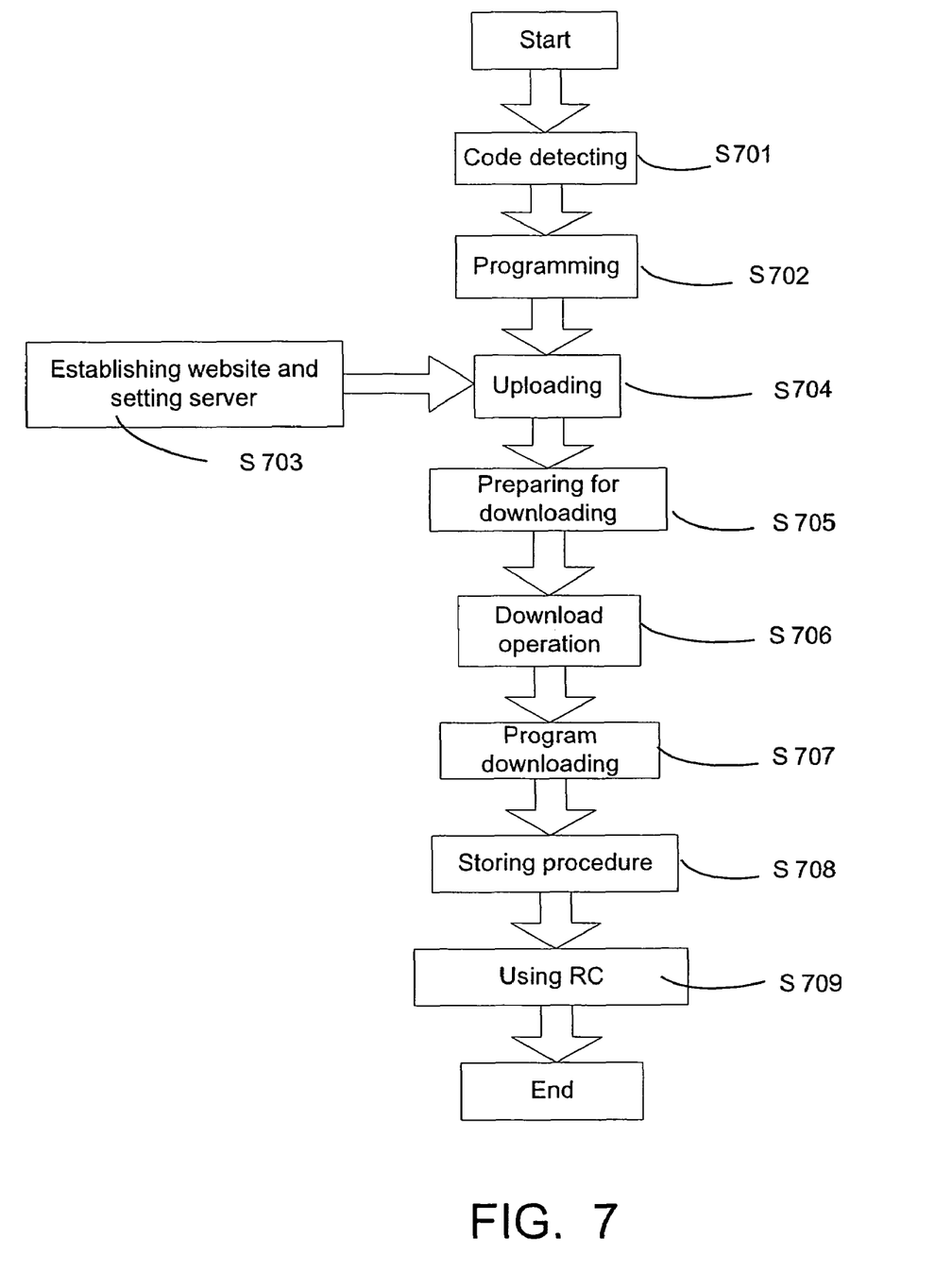
FIG. 7 shows the operation flow chart of the entire system in the invention.

Please refer to FIG. 7 for the operation procedure of the entire system. Step S701 completes a step for detecting the code, the method for obtaining the code values has been described above. After the code values are obtained, the programming operation is performed in step S702, and it is tested after programming. If the testing is proved and no problem occurs after checking, then in step S704, the data are uploaded to the website. Before uploading the data, the dedicated website and the server for the RC should be provided in step S703. Before the client terminal logs on the dedicated website of the RC, the preparation for downloading should be made in step S705, for example, interfacing the USB ports of two devices, and the like. Then in the operation step S706, downloading the code program based on the instructions on the screen. After completing the downloading of the code program in step S707, in step S708, to store into $E^2PROM$ by implementing a program of MCU. In this way, in step S709, the URC can implement the corresponding function of the RC.

Figure 8:
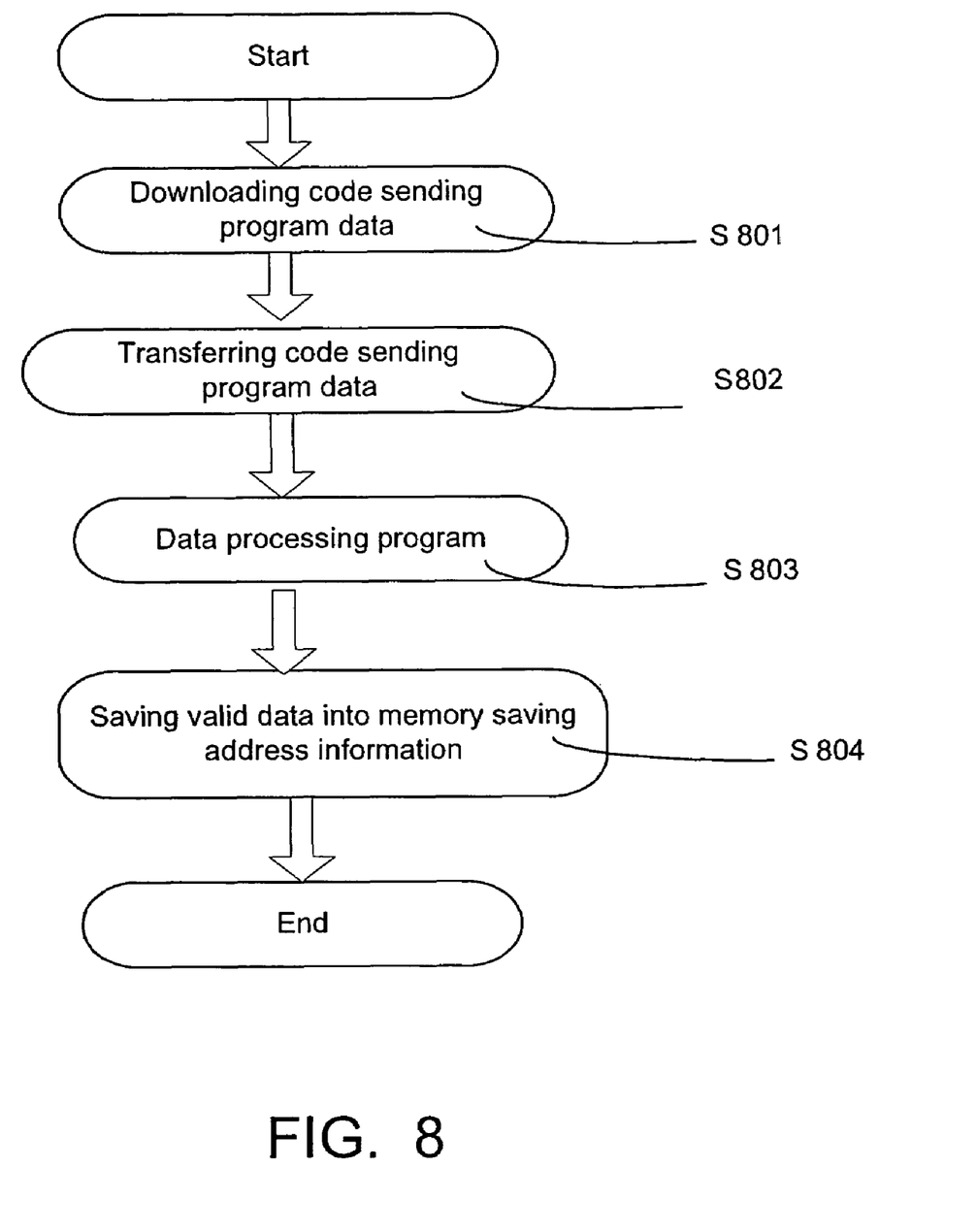
FIG. 8 shows a schematic diagram of the steps for downloading the data from the network in the invention.
Figure 9:
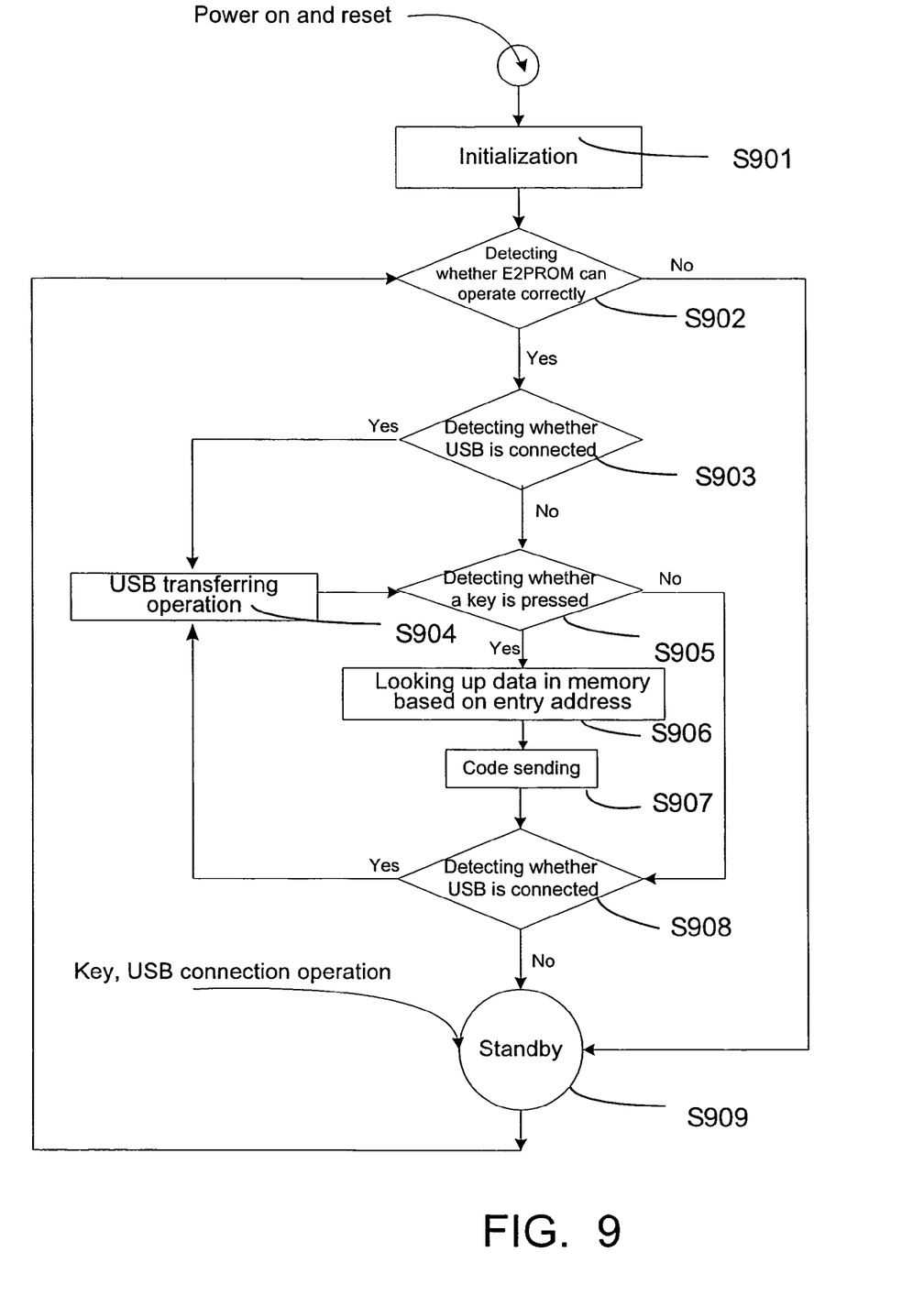
FIG. 9 shows a schematic diagram of the steps for sending the codes by the URC in the invention.

FIG. 8 and FIG. 9 are the procedures of the steps for the MCU kernel to process the data in the downloading processing and the data in the code sending processing. In FIG. 8, after starting the downloading of the data, the data in the code sending program are passed through the USB interface circuit in step S801, and inputted to MCU kernel in step S802 to perform the processing program for the data in step S803, and it stores the data in the code sending program into E²PROM, and saves the information addresses in step S804. In FIG. 9, when the URC is used, after the circuits are powered on and reset, firstly, the initialization is implemented internally in MCU circuit in step S901, then whether E²PROM can operate correctly or not is detected in step S902. The object of the detection is to decide whether E²PROM can perform correctly the operation of reading or writing (fixed content can be written into the specific address) before the program jumping to E²PROM. If not, then it will jump to standby, and at this time, an error indication lamp will be on. If it can operate correctly, then whether the USB port is connected or not will be detected in step S903. If it is connected, then it can perform the USB transmission operation in step S904, otherwise, whether a key is depressed or not will be detected in step S905. If a key is depressed, then the program data will be looked up in the memory based on the entry address of the key in step S906, then the code sending operation will be implemented in step S907. If no key is depressed, then whether the USB interface is connected or not will be detected in step S908. If it is connected, then the cycle will enter step S904, otherwise, then it will enter the standby state in step S909.

In the invention, the software programming associated with the hardware structure has its own features. Normally, for the conventional URC, its program calls the code data and program to perform the code sending processing, and the code data and program is disposed normally in a dedicated code data and program area. When the procedure is executed to send the code, the code data and program can be called based on the address. The USB interface data processing program, keyboard scanning program, key processing program are stored internally in such new URC, the program processing procedure is shown in FIG. 8. The data processing program mainly processes the data, which are downloaded from the network and transferred to MCU via the USB interface, transfers the data to E²PROM based on the PC pointer, processes the data transferred by the USB interface, determines whether the key code program exists on the corresponding position and performs the corresponding operation. The keyboard scanning program and the key processing program are essential parts for implementing the function of the RC, as shown in FIG. 9. When the codes are sent, the code value program in E²PROM can be read and written as required. The code value program in E²PROM is divided normally into segments each being 0.5 K, each includes a RC type. Thus, there are several separate program spaces including several types of RCs. In the key code sending program, there are a plurality of important parameters relating to the code-model, such as the data of the carrier, frequency, duty cycle, high and low voltage level for sending the code and the program for outputting the code-model. Normally, in E²PROM, each segment in ROM area is 0.5K and each segment stores one code value program, and the memory having a capacity of 16K or more can be selected as E²PROM.

In the present embodiment, the URC is the most important device in the system to realize mainly the downloading of the code value program and the function of the RC. After the code value program of the user is downloaded from the website, a procedure for filling the codes is realized. After downloading the data stream, the data are converted from the serial format to the parallel format which can be accepted by the MCU in the USB interface circuit via the USB interface protocol (The version can be updated, including V1.0, V1.1, or V2.0), and the data stream flows into the MCU via the parallel lines. A part of the data processing program is included in the MCU kernel, and it can be used to analyze and process the downloaded code value program, and to decide whether the key program exists on the corresponding position in E²PROM, then the corresponding code values are inputted to E²PROM in a DMA manner and the program is saved in the fixed positions according to the value of PC. When the user requires using the RC, after the corresponding operation key is activated, the MCU is waked up, and it will be decided by the key program to find the corresponding code value program segment in E²PROM based on the obtained PC pointer value. After finding the code value program, the code sending processing is performed by the program, in this way, the desired function of the RC can be realized.

Summing up the above, nowadays, with the development of the network, the system and method for providing the operation of the URC through the network in the invention emerge as the requirement of our times. Aiming at the specific situation of the current market of the URC, a service mode and a product are provided to allow the operation to be easier and to benefit a large numbers of users. This solves effectively the problems in the current confused market of the URC. The construction of the specific device in the above implementation method of the invention can be modified on the basis of the basic technical scheme of the invention, for example, the main function of the RC device can be realized by using single chip integrated circuit, the key panel of the RC may have different layout-designs, and the internal memory in the code detecting device and the internal devices for storing the data in the RC can be changed, and the like. The display panel of the RC can be realized by using the liquid crystal display, the panels of different types of RCs can be illuminated at different regions during the operation; the operation of the touch screen can be used to realize the operation of the RC. These do not depart the protection scope as claimed in the Claims of the invention.

What is claimed is:

1. A system for the network operation of the URC, said system comprising:
    a user service subsystem for collecting the code-model information of a RC, encoding said information into a code data and program having a data format which can be used directly, and uploading said code data and program to the server device via the Internet;
    a server device, said server device is connected with the user service subsystem and a user operation subsystem via the Internet, and is used for receiving, storing, exchanging and uploading the data for generating the web page and the code data and program; and
    a user operation subsystem, this part comprises a URC and a user terminal device, and is used for providing the users with the services for the URC on the network via the Internet;
    wherein said URC comprises a memory, said memory can be divided into several areas based on the addresses, a space having a certain size is used as the storing space of one RC, in this way, code data and programs of several types of RCs can be stored individually in said memory.

2. The system as described in claim 1, wherein said user service subsystem is composed of a sampling device, a code detecting device and a programming and uploading device, wherein the sampling device refers to a device used for collecting the data from prototype devices, said prototype devices are various types of RCs from different factories, said code detecting device is supplied by the service provider.

3. The system as described in claim 2, wherein said sampling device is connected with the code detecting device, and is used for storing the infrared signal information collected from a prototype RC to be sampled into a RAM via an infrared receiving circuit; the code detecting device is connected with the RC sampling device and the programming and uploading device, and is used for analyzing and processing the collected code-model information to convert to a format to be used directly; the programming and uploading device is connected with the code detecting device, and connected simultaneously with a data storing/exchanging device via the Internet, and is used for converting the code-model data into the specific programs and storing these programs into said server device.

4. The system as described in claim 1, wherein said server device comprises a data storing/exchanging device.

5. The system as described in claim 1, wherein said user terminal device is a device for the users to connect the network to realize the operation of said service, while said URC is a device used by the user for realizing the remote control of the electronic home appliances, and the function of said device can be updated by downloading the program data from said server device, the method for connecting between the URC and the network is to connect interface by interface through a USB interface in the URC and the user terminal device used for connecting the network, if the infrared signals can be received and transmitted directly by the user terminal device, then the communication can also be realized directly by an infrared transmitting and receiving device.

6. A method for the network operation of the URC, comprising the steps of:
   collecting the parameters of an existing user's RC via a RC sampling device;
   analyzing and processing the parameters of the user's RC collected by the sampling device via the code detecting device to allow the code-model parameters to be accurate and detailed;
   inputting the data obtained by the code detection to the programming and uploading device, converting the code-model data into the specific programs and transferring to the server device via the Internet in order to be used for data storing and exchanging, said server device being used as a platform for data exchanging; and
   reading the required program from the server device by the URC via the user terminal device and the Internet to realize the function of the URC;
   wherein said URC comprises a memory, said memory can be divided into several areas based on the addresses, a space having a certain size is used as the storing space of one RC, in this way, code data and programs of several types of RCs can be stored individually in said memory.

7. The method as described in claim 6, wherein said step for reading the required program is: firstly, to initialize internally the MCU circuit, then to detect whether $E^2PROM$ can operate correctly or not, the object of the detection is to decide whether the operation of reading and writing the fixed contents at the specific addresses can be performed by $E^2PROM$ before the program jumping to $E^2PROM$, if not, then it will jump to the standby state and will be indicated by an error lamp at this time, if it can operate correctly, then whether the USB port is connected or not will be detected, if it is connected, then the USB transmission operation will be performed to input the program data into the MCU kernel via the USB interface protocol, and then to assign to the corresponding locations in the $E^2PROM$ based on the entry addresses.

8. A URC for realizing the system as described in claim 1, wherein said device comprises:
   a keyboard matrix, said keyboard matrix comprises the keyboard matrix regions of the RCs of two or more types of consumable electronic products, and can combine different types of keyboard matrix regions based on the requirements, wherein each keyboard matrix region comprises the basic keyboard content required by said consumable electronic product;
   a MCU kernel, used for processing the transmission of the program data while downloading the program, communicating with the interface circuit and controlling the operation of the $E^2PROM$ for storing data, during the procedure of using the RC, the program in the $E^2PROM$ can be processed directly to realize the function of the RC, said MCU kernel is connected with the keyboard matrix;
   $E^2PROM$, used for storing the program to be saved while downloading the program, and for outputting the stored program when sending the codes, said $E^2PROM$ is connected with the MCU kernel; and
   an interface circuit, used as an interface circuit for connecting while downloading the program data, said USB interface circuit is connected with the MCU kernel
   wherein said $E^2PROM$ can be divided into several areas based on the addresses, a space having a certain size is used as the storing space for one RC, in this way, code data and programs of several types of RCs can be stored individually in $E^2PROM$.

9. The device as described in claim 8, wherein said keyboard matrix comprises a VCD/DVD keyboard matrix region, a VCR keyboard matrix region, a TV keyboard matrix region, and a common keyboard matrix region.

10. The device as described in claim 8, wherein said interface circuit is a USB interface circuit.

11. The device as described in claim 8, wherein said interface circuit can also be an infrared receiver.

12. The device as described in claim 8, wherein said URC also comprises an infrared transmitter used for sending the code-model during the code sending operation, it is driven by a transistor, and said infrared transmitter is connected with the MCU kernel.

13. The device as described in claim 8, wherein said interface circuit, $E^2PROM$, and MCU kernel can be realized by integrating in one integrated circuit.

* * * * *